A. LILGE.
FLY VASE.
APPLICATION FILED JULY 8, 1910.
983,977.
Patented Feb. 14, 1911.
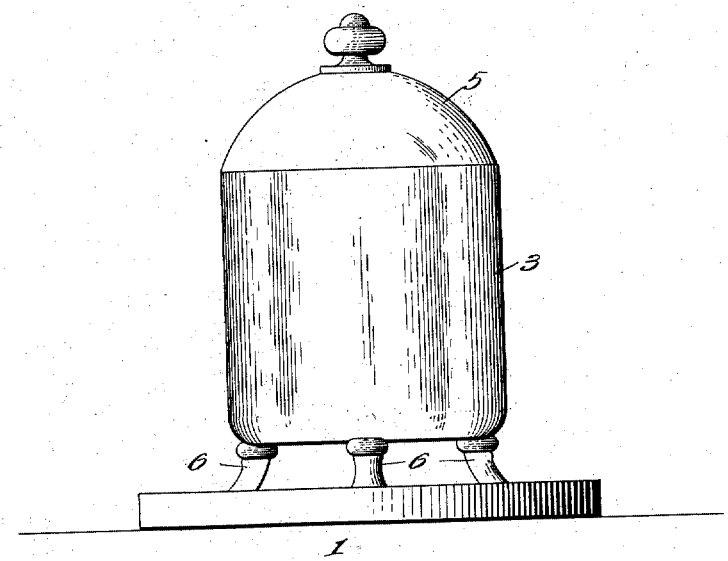
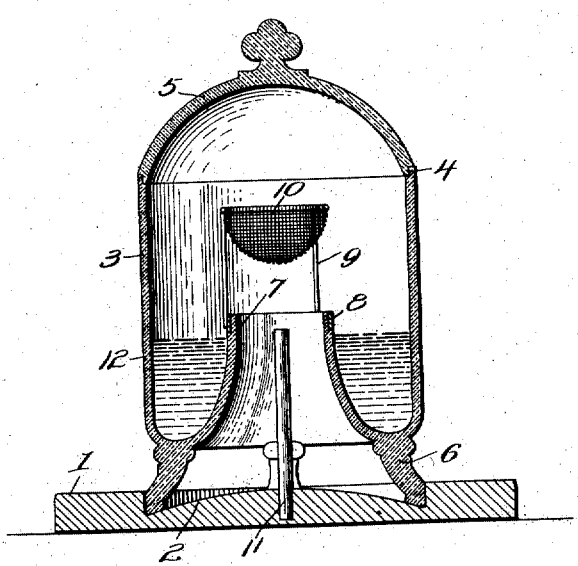
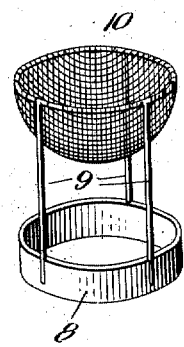
Inventor
Andreas Lilge.
Witnesses
F. C. Gibson
Wm J Roberts
By Victor J. Evans
Attorney

UNITED STATES PATENT OFFICE.

ANDREAS LILGE, OF EDMONTON, ALBERTA, CANADA.

FLY-VASE.

983,977.   Specification of Letters Patent.   Patented Feb. 14, 1911.

Application filed July 8, 1910. Serial No. 571,054.

*To all whom it may concern:*

Be it known that I, ANDREAS LILGE, a subject of the King of Great Britain, residing at Edmonton, in the Province of Alberta and Dominion of Canada, have invented new and useful Improvements in Fly-Vases, of which the following is a specification.

This invention relates to improvements in fly traps, and the object of the invention is to provide a device of this character which is extremely simple in construction, which can be manufactured at a low cost, and which will perform the functions for which it is adapted with ease and accuracy.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a side elevation of a trap constructed in accordance with the present invention. Fig. 2 is a central longitudinal sectional view of the same. Fig. 3 is a perspective view of the bait box.

In the accompanying drawings the numeral 1 designates the base of the device. This base 1 may be constructed of any suitable material and is provided with a depression 2 upon its upper face, which is adapted to serve as a support for the trap proper, as well as to serve as a pocket for the reception of a suitable bait.

The numeral 3 designates the trap proper. This trap is preferably cylindrical in cross section and is also preferably constructed of glass. The top of the trap 3 is provided with an annular recess forming a shoulder 4, the said shoulder as well as the top of the trap 3 being adapted to receive a removable closure 5. The bottom of the trap 3 is provided with a plurality of leg members 6, the same being preferably arranged at an angle so as to contact the wall provided by the pocket 2. The under face of the trap 3 has an integrally formed upwardly extending member 7. This member 7 is preferably tubular and mounted upon the top thereof is a ring member 8. This ring member is provided with a plurality of upwardly extending arms 9, the same being adapted to support a cup-shaped bait box 10. The base 1 is provided with a vertical projecting member 11, the same being adapted to project centrally within the pipe or extension 7, and the same being adapted for a purpose hereinafter to be fully set forth.

In setting the trap a small amount of bait, such as sugar is placed within the pocket 2 of the base 1 around the projecting post 11. It will be noted by reference to the several figures of the drawing that the base of the trap 3 is positioned a suitable distance away from the base 1, and flies being attracted by the sugar upon the base freely enter between the legs of the trap and the base member 1. The bait box 10 is filled with a suitable bait and the flies being attracted by the said bait will walk upwardly upon the projection 11 and from thence will fly between the bars 9 to obtain access to the bait within the box 10. It will be noted that the box 10 is of a width equaling or slightly exceeding the top of the pipe or extension 7 and when the fly has attained its fill it will attempt to fly upwardly and as a consequence contact the top of the closure 5, and will drop within the trap between the pipe member 7 and the side walls of the said trap. The space between these walls is filled with a suitable destroying substance, such as soapy water and as the interior of the trap is of a polished surface the flies cannot escape along the sides of the trap or along the sides of the extension 7. It is of course obvious that the fly need not necessarily contact the top of the closure 5, but the said fly in attempting to escape will either contact the said closure or the side walls of the trap and be forced within the destroying fluid.

From the above description, taken in connection with the accompanying drawings, it will be noted that I have provided an extremely simple and thoroughly effective device for the purpose intended, and while I have illustrated and described the preferred embodiment of the improvement, as it now appears to me, minor details of construction within the scope of the following claim may be resorted to if desired.

Having thus fully described the invention, what I claim as new is:—

A trap of the class described comprising a base member, said base member being provided with a depressed pocket, the center of said pocket having an upstanding member, a trap, said trap having its bottom portion formed with a centrally arranged inwardly projecting tube, legs for the trap, said legs adapted to engage the vertical wall formed by the pocket, a ring for the tubular projection of the trap, a plurality of spaced rods upon the ring, a cup-shaped bait box supported by the rods, and a removable closure for the upper open end of the trap.

In testimony whereof I affix my signature in presence of two witnesses.

ANDREAS LILGE.

Witnesses:
LUDWIG LILGE.
ET. E. DELAVAULT.